United States Patent
Wakabayashi et al.

[11] Patent Number: 5,499,071
[45] Date of Patent: Mar. 12, 1996

[54] APPARATUS FOR DETECTING ROTATION OF MOTOR FOR CAMERA

[75] Inventors: Hiroshi Wakabayashi, Yokohama; Hidenori Miyamoto, Urayasu; Isao Soshi, Tokyo, all of Japan

[73] Assignee: Nikon Corporation, Tokyo, Japan

[21] Appl. No.: 400,476

[22] Filed: Mar. 8, 1995

Related U.S. Application Data

[63] Continuation of Ser. No. 144,351, Nov. 1, 1993, abandoned.

[30] Foreign Application Priority Data

Nov. 2, 1992 [JP] Japan ................................. 4-294469

[51] Int. Cl.⁶ .................................................. G03B 1/18
[52] U.S. Cl. ........................ 354/173.1; 354/485
[58] Field of Search .................... 354/400, 485, 354/173.1, 173.11, 217, 195.1, 195.12

[56] References Cited

U.S. PATENT DOCUMENTS 4,873,542  10/1989  Nakayama ............................ 354/400
4,999,656   3/1991  Shimizu et al. .................. 354/195.12

Primary Examiner—Howard B. Blankenship
Attorney, Agent, or Firm—Shapiro and Shapiro

[57] ABSTRACT

An apparatus for detecting the rotation of a motor for a camera comprises an encoder rotatable in synchronism with the driving of a motor for driving a driven portion in the camera, a photointerrupter for detecting slits formed in the encoder and outputting pulse signals, and a circuit board having disposed thereon a control element to which the pulse signals from the photointerrupter are input, the photointerrupter being installed on the circuit board.

10 Claims, 3 Drawing Sheets

APPARATUS FOR DETECTING ROTATION OF MOTOR FOR CAMERA

This is a continuation of application Ser. No. 08/144,351, filed Nov. 1, 1993, now abandoned.

BACKGROUND OF THE INVENTION

1. Field of the Invention

This invention relates to an apparatus for detecting the rotation of a motor disposed in a camera.

2. Related Background Art

For the focus adjustment or the like of a lens, it has heretofore been practiced to detect the rotation of a motor for driving a lens barrel by a motor rotation detecting apparatus, and for detecting the position of the lens barrel disposed in a camera.

FIG. 1 of the accompanying drawings shows a camera provided with such a motor rotation detecting apparatus. In this camera, a motor 2 in a camera body 1 is driven, whereby a lens barrel 10 having a lens contained therein is rotated through a train of reduction gears 3, 4, 5, 6, 7 and 8 and a lens barrel gear 9 and is moved back and forth.

Also, an encoder 14 is rotated through speed increasing gears 11, 12 and 13 for rotating the encoder. Slits 14a formed in the encoder 14 are detected by a photointerrupter 15, and pulse signals corresponding to the slits 14a are input from the photointerrupter 15 to a control element 17 via a circuit substrate (board) 16, and the current position of the lens barrel 10 is calculated by the control element 17 on the basis of the pulse signals.

In this camera, the photointerrupter 15 and the circuit substrate 16 are connected together through a flexible print substrate 18, and the photointerrupter 15 is fixed to the camera body 1 with a support member 19 interposed therebetween.

In FIG. 1, the reference numeral 20 designates a cover member, and the reference numeral 21 denotes a window portion for AF.

In such a prior-art camera, however, the fact that the photointerrupter 15 and the circuit substrate 16 are connected together through the flexible print substrate 18 and the photointerrupter 15 is fixed to the camera body 1 with the support member 19 interposed therebetween has led to problems such as increased costs and the bulkiness of the camera.

SUMMARY OF THE INVENTION

The present invention has been made in order to solve such problems peculiar to the prior art and an object thereof is to provide an apparatus for detecting the rotation of a motor for a camera, which apparatus can reduce costs more greatly than before and can also achieve the downsizing of the camera.

In an apparatus for detecting the rotation of a motor for a camera according to the present invention, there is provided an encoder rotated in synchronism with the driving of the motor for driving a driven portion in the camera, a photointerrupter for detecting slits formed in said encoder and outputting pulse signals, and a circuit substrate having disposed thereon a control element to which the pulse signals from said photointerrupter are input, said photointerrupter is installed on said circuit substrate.

In the apparatus for detecting the rotation of a motor for a camera according to the present invention, as described above, the photointerrupter is installed on the circuit substrate and therefore, a flexible print substrate for connecting the photointerrupter and the circuit substrate together and a support member for fixing the photointerrupter to the camera body become unnecessary.

DESCRIPTION OF THE PREFERRED EMBODIMENTS

An embodiment of the present invention will hereinafter be described in detail with reference to the drawings.

Figure 1:
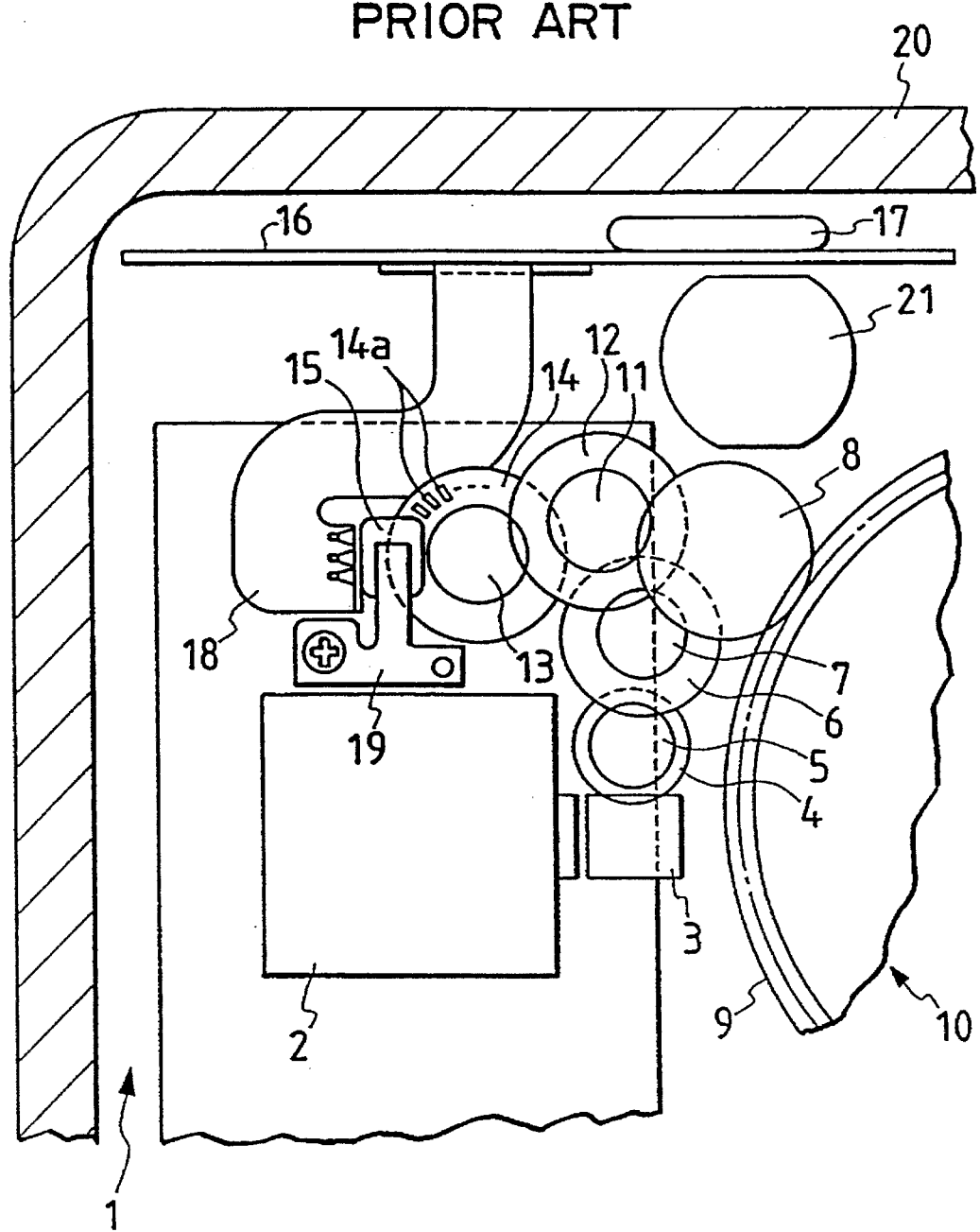
FIG. 1 is a cross-sectional view showing a camera provided with a motor rotation detecting apparatus according to the prior art.
Figure 2:
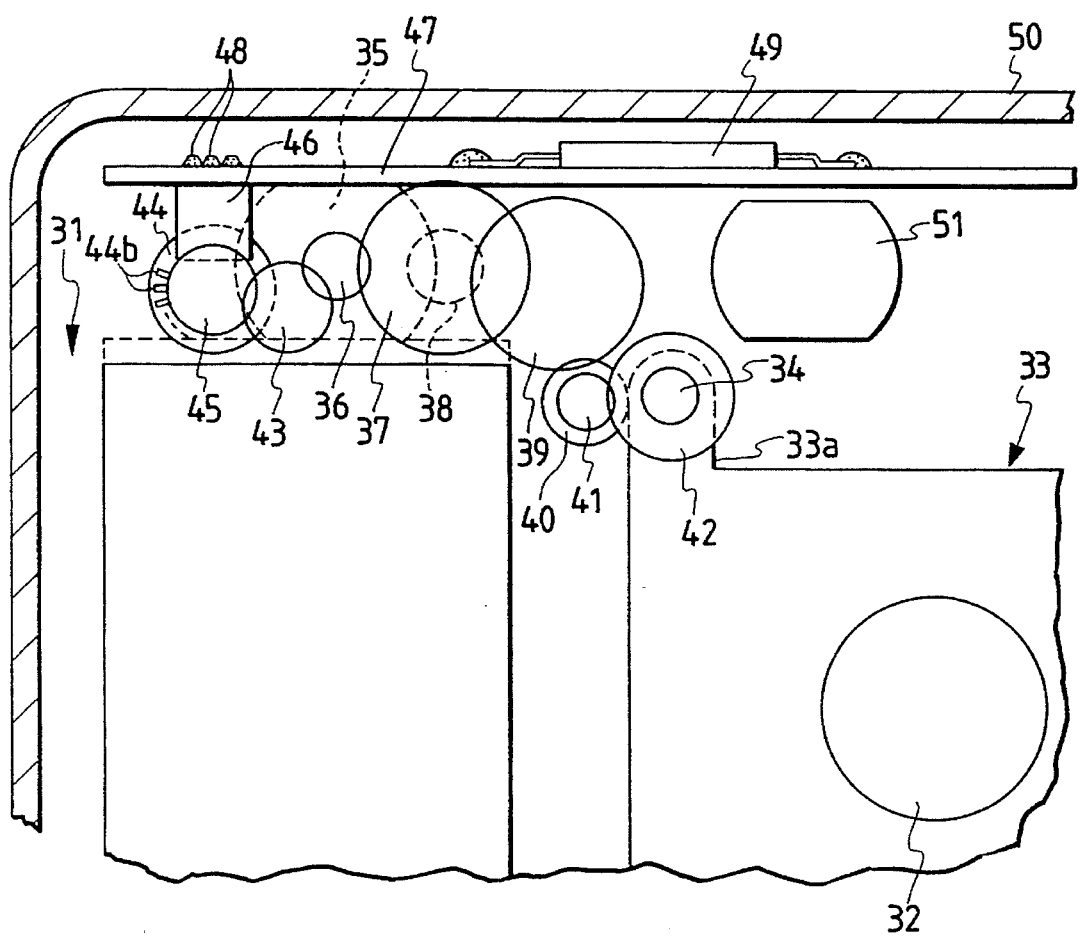
FIG. 2 is a transverse cross-sectional view of a camera provided with an embodiment of the motor rotation detecting apparatus of the present invention.
Figure 3:
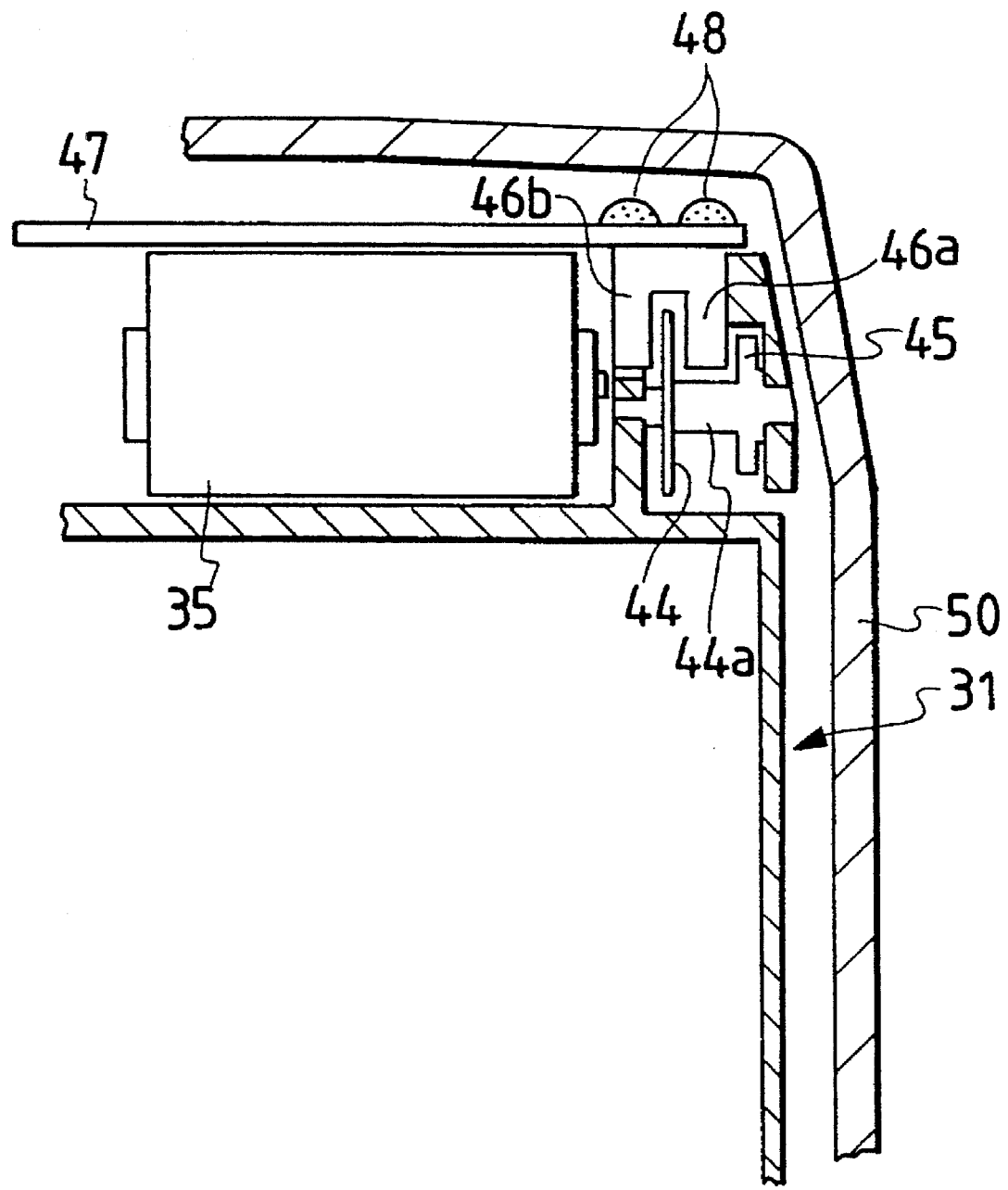
FIG. 3 is a longitudinal cross-sectional view of the camera of FIG. 2.

FIGS. 2 and 3 show a camera provided with an embodiment of the motor rotation detecting apparatus of the present invention. In these figures, the reference numeral 31 designates a camera body.

At the center of the camera body 31, there is disposed a lens barrel 33 in which a photo-taking lens 32 is contained.

A feed screw 34 is threadably engaged with the bracket portion 33a of the lens barrel 33, which is movable back and forth by the rotation of the feed screw 34.

A motor 35 is disposed on the upper surface of the camera body 31.

A gear 36 is fixed to the rotary shaft of the motor 35, and the rotation of the gear 36 is transmitted through a train of reduction gears 37, 38, 39, 40 and 41 to a gear 42 fixed to the feed screw 34.

Also, the rotation of the gear 36 is transmitted through a transmission gear 43 to a gear 45 fixed to the rotary shaft 44a of an encoder 44.

The encoder 44 is of a disc-like shape and has a number of slits 44b radially formed therein.

A photointerrupter 46, which outputs a pulse signal each time it detects a slit 44b by a light projecting portion 46a and a light receiving portion 46b, is disposed in such a manner as to embrace the encoder 44.

This photointerrupter 46 is directly fixed to a circuit substrate (board) 47 horizontally disposed above the camera body 31.

In this embodiment, the foot portion of the photointerrupter 46 is inserted into a hole in the circuit substrate 47 and is soldered at 48 thereto, whereby the photointerrupter 46 is fixed to the circuit substrate 47 and at the same time, is connected to the circuit of the circuit substrate 47.

On the circuit substrate 47, there is disposed a control element 49 comprising, for example, a CPU for receiving as an input the pulse signal from the photointerrupter 46, and calculating the current position of the lens barrel 33 on the basis of the pulse signal.

In FIG. 2, the reference numeral 50 designates a cover member, and the reference numeral 51 denotes a window portion for AF.

In the above-described camera, by the motor 35 being driven, the feed screw 34 is rotated through the gear 36, the train of reduction gears 37, 38, 39, 40 and 41 and the gear 42, whereby the lens barrel 33 having the photo-taking lens 32 contained therein is moved back and forth.

Also, by the rotation of the motor 35, the rotary shaft 44a of the encoder 44 is rotated through the transmission gear 43 and the gear 45, whereby the encoder 44 is rotated in synchronism with the rotation of the motor 35. The slits 44b formed in the encoder 44 are detected by the photointerrupter 46, and pulse signals corresponding to the slits 44b are input from the photointerrupter 46 to the control element 48 on the circuit substrate 47, and the current position of the lens barrel 33 is calculated by the control element 49 on the basis of the pulse signals.

Thus, in the above-described motor rotation detecting apparatus, the photointerrupter 46 is installed on the circuit substrate 47, and therefore, a flexible print substrate for connecting the photointerrupter 46 and the circuit substrate 47 together and a support member for fixing the photointerrupter 46 to the camera body 31 become Thus, production costs can be greatly reduced and the downsizing of the camera can be achieved.

Also, in the above-described camera, the photointerrupter 46 is fixed in advance to the circuit substrate 47 by, for example, soldering 48. Therefore, after the motor 35, the encoder 44, the gears 36, 43, 45, etc. are assembled on the camera body 31 side, it becomes possible to locate the photointerrupter 46 at a predetermined detecting position simply by putting the circuit substrate 47 at a predetermined position, and assemblage of the camera can be greatly improved.

In the above-described embodiment, description has been made of an example in which the present invention is applied to the photointerrupter 46 for detecting the rotation of the motor 35 which drives the lens barrel 33, whereas the present invention is not restricted to such an embodiment, but of course, can be equally applied, for example, to a photointerrupter for the detection of the amount of feed of film which detects the rotation of an encoder rotated in synchronism with the feeding of the film fed by the driving of a motor.

As described above, in the motor rotation detecting apparatus of the present invention, the photointerrupter is installed on the circuit substrate and therefore, the flexible print substrate for connecting the photointerrupter and the circuit substrate together and the support member for fixing the photointerrupter to the camera body become unnecessary, and this leads to the advantage that costs can be greatly reduced and the downsizing of the camera can be achieved.

What is claimed is:

1. An apparatus for detecting rotation of a motor for a camera, comprising:

an encoder rotatable in synchronism with the motor;

a photointerrupter for detecting slits formed in said encoder and outputting pulse signals; and a circuit board having disposed thereon a control device to which the pulse signals from said photointerrupter are input;

said photointerrupter being mounted directly on said circuit board.

2. An apparatus according to claim 1, wherein said photointerrupter is positioned on said circuit board so that said photointerrupter may be located at a detecting position when said circuit board is mounted on a body of the camera.

3. An apparatus according to claim 1, wherein said photointerrupter is soldered to said circuit board.

4. In a camera having a camera body and a drive motor, apparatus for detecting rotation of the drive motor, said apparatus comprising:

an encoder rotatable in synchronism with the motor;

a circuit board;

a photointerrupter mounted directly to said circuit board, said circuit board being disposed in said camera body such that said photointerrupter is positioned for detecting slits formed in said encoder; and a control device disposed on said circuit board for receiving output pulse signals from said photointerrupter.

5. An apparatus according to claim 4, wherein said photointerrupter is soldered to said circuit board.

6. An apparatus for detecting rotation of a motor for a camera, comprising:

an encoder rotatable in synchronism with the motor;

a photointerrupter for detecting said encoder and outputting pulse signals; and a circuit board having disposed thereon a control device to which the pulse signals from said photointerrupter are input;

said photointerrupter being mounted directly on said circuit board.

7. An apparatus according to claim 6, wherein said photointerrupter is positioned on said circuit board so that said photointerrupter may be located at a detecting position when said circuit board is mounted on a body of the camera.

8. An apparatus according to claim 6, wherein said photointerrupter is soldered to said circuit board.

9. In a camera having a camera body and a drive motor, apparatus for detecting rotation of the drive motor, said apparatus comprising:

an encoder rotatable in synchronism with the motor;

a circuit board;

a photointerrupter mounted directly to said circuit board, said circuit board being disposed in said camera body such that said photointerrupter is positioned for detecting said encoder; and a control device disposed on said circuit board for receiving output pulse signals from said photointerrupter.

10. An apparatus according to claim 9, wherein said photointerrupter is soldered to said circuit board.

* * * * *